Dec. 5, 1961 W. W. ROBBINS 3,012,090
UTILITY FIXTURE
Filed Feb. 21, 1958 3 Sheets-Sheet 1

INVENTOR:
WILLIAM W. ROBBINS
BY Howson & Howson
ATTYS.

Dec. 5, 1961 W. W. ROBBINS 3,012,090
UTILITY FIXTURE
Filed Feb. 21, 1958 3 Sheets-Sheet 2
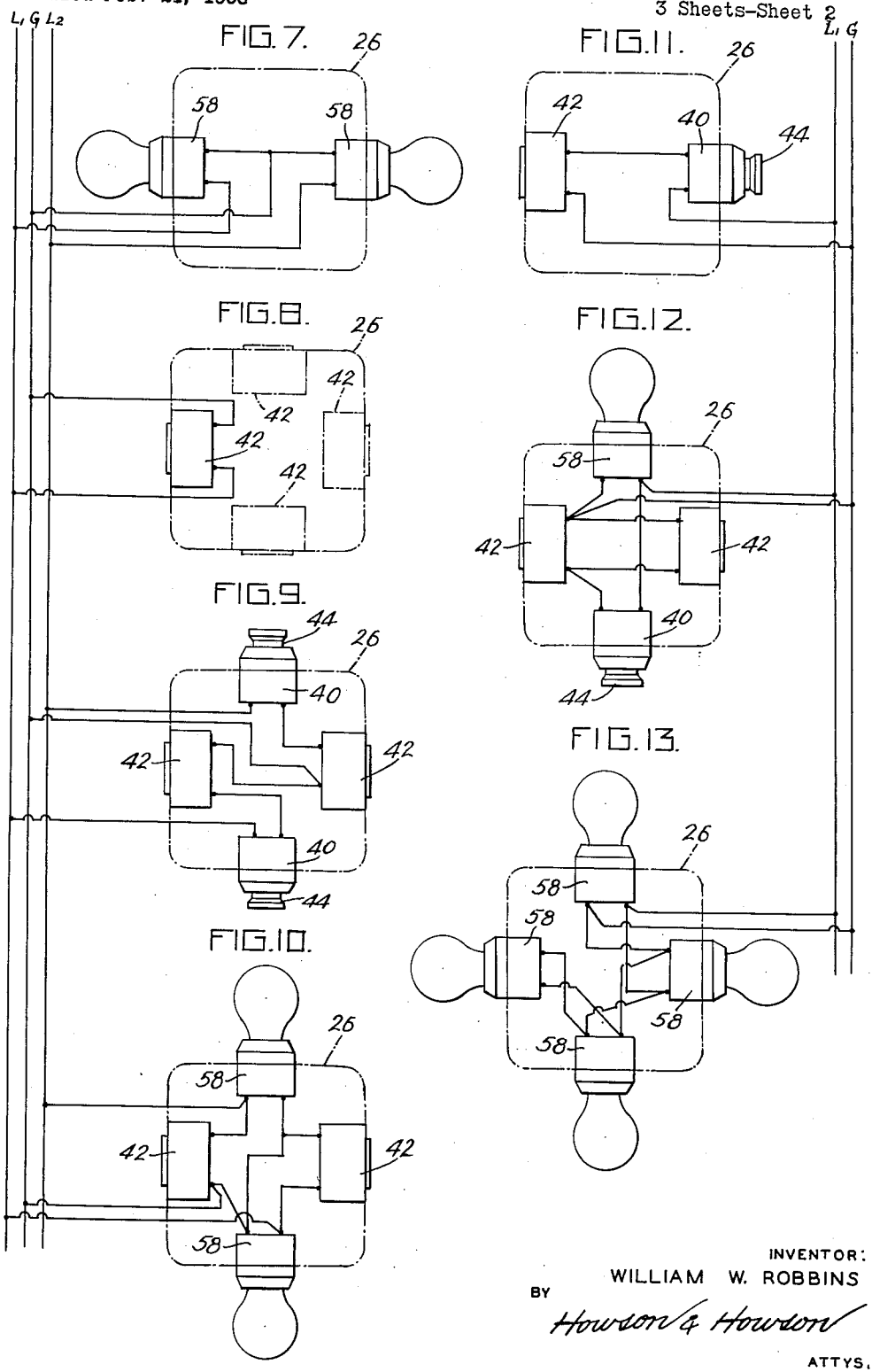
INVENTOR:
WILLIAM W. ROBBINS
BY
Howson & Howson
ATTYS.

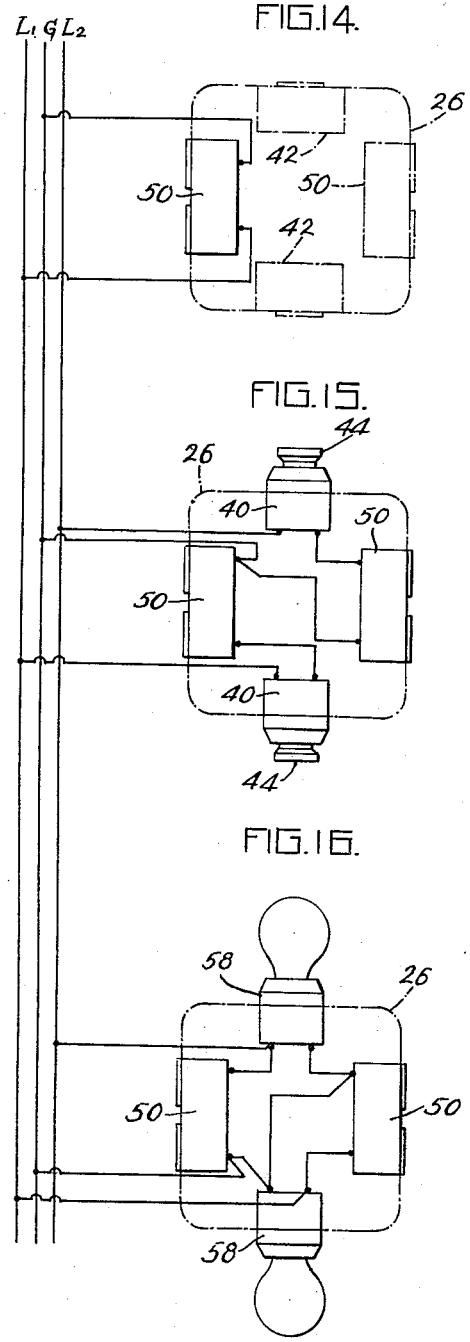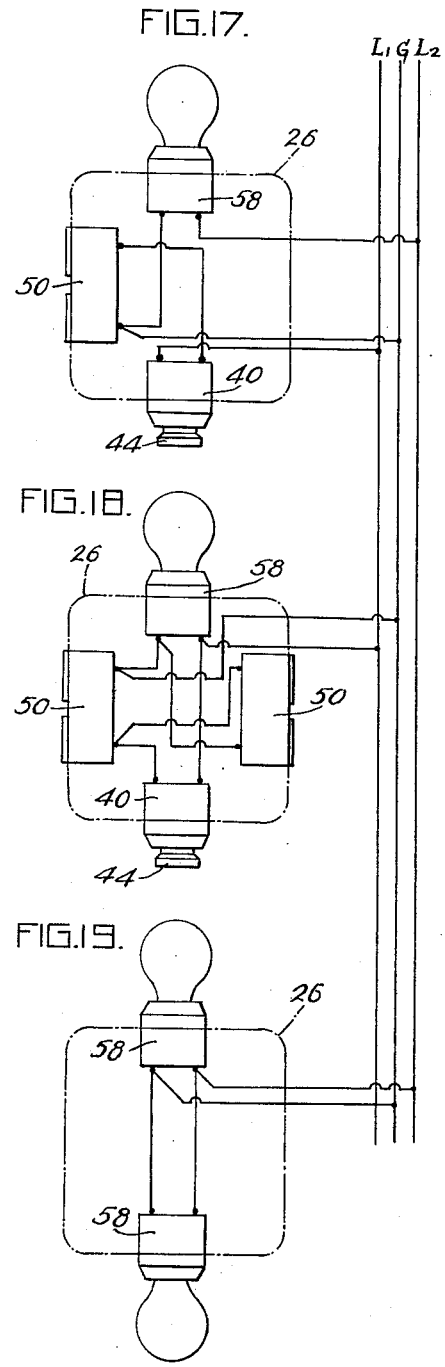

United States Patent Office 3,012,090
Patented Dec. 5, 1961

3,012,090
UTILITY FIXTURE
William W. Robbins, 204 Indian Spring Drive,
Silver Spring, Md.
Filed Feb. 21, 1958, Ser. No. 716,684
4 Claims. (Cl. 174—52)

The present invention relates broadly to electrical fixtures, and more particularly to a utility fixture adapted for use in connection with electrical circuits of a new and improved nature providing a high degree of utility, and incorporating outstanding safety features.

It is an object of the invention to provide such a utility fixture which is of a durable construction and which will provide space for one or two electric plug receptacles and one or two fuse receptacles if required. Additionally, a standard type of box cover can be used for covering the open side of the fixture or, if desired, it may be equipped with a sign receptacle to provide space for an electric light or pilot light.

Another object of the present invention is to provide such a utility fixture having a plurality of knock-out type punchings in the sides or other surfaces thereof which will render it possible to equip the fixture with the electrical components needed for a certain purpose, and at the same time provide metallic covering for electrical conductors enclosed therein.

A further object of the present invention is to provide such a utility fixture which, due to its construction, can be equipped with electrical devices in such manner that it will become a "terminal" box for a metallic protected electrical distribution system, and wherein the knock-outs will be of size and design to accommodate currently existing devices.

A still further object of the present invention is to provide in such a utility fixture openings in the back surface thereof so that it may be attached directly to the end of a piece of conduit, or it may be attached directly to the open side of any standard electrical conduit box and used as a surface mounted terminal box.

At the present time, in order to obtain maximum light and power benefits at a given point through the use of available standard electrical outlet boxes, it is necessary to use three metallic boxes, three pipe couplings, six chase nipples, and three box covers designed to accommodate either plug receptacles or screw base lamp sockets. The present invention will eliminate the necessity for the above materials since it is designed to serve as a chassis wherein and/or whereon electrical plug, fuse and/or light receptacles can be mounted and connected to the distribution system with the same maximum of safety and at a new low minimum cost.

The device of the present invention is designed to be used with standard available box and conduit fittings whereby it is possible to install it as a component part of a grounded metallic protected electrical distribution system.

A still further object of the present invention is to provide a utility fixture having great flexibility as to electrical fitting combinations that can be installed therein, and which accordingly can be adapted for uses in many different industries to reduce maintenance and operating costs, and to greatly increase safety in such industries. Among others, the present utility fixture is readily adapted for use in laundries, manufacturing, garages and body works, service stations, print shops, building and construction and in other industries, as will be readily apparent from the following description of embodiments thereof.

Other objects and advantages of the invention will be more readily apparent from the following detailed description of embodiments thereof when taken together with the accompanying drawings in which.

Figure 3:
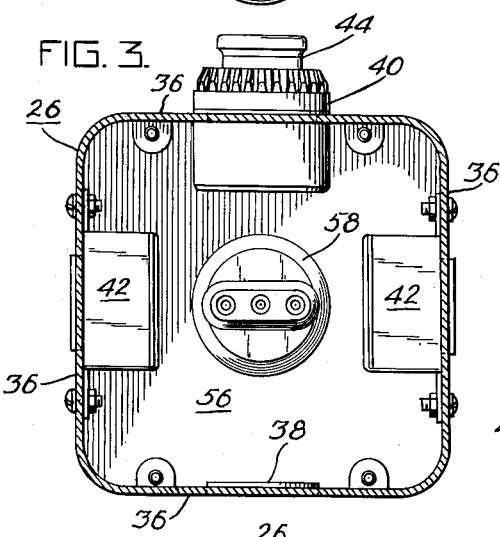
FIG. 3 is a sectional view taken on line 3—3 of FIG. 2.
Figure 5:
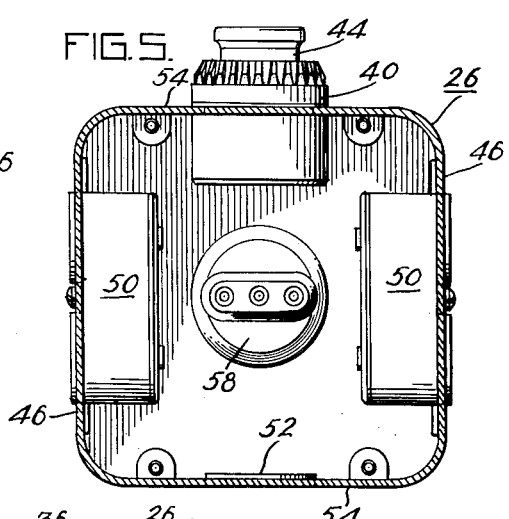
FIG. 5 is a sectional view corresponding to FIG. 3 and showing a modified form.
Figure 6:
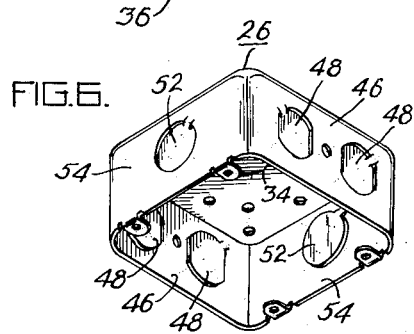
FIG. 6 is a bottom perspective view of the chassis of FIG. 5.
Figure 4:
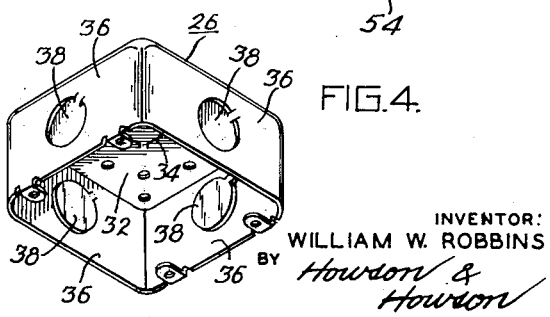
FIG. 4 is a bottom perspective view of the chassis of the embodiment of FIG. 3.

FIGS. 7–13 inclusive are schematic illustrations of various ways the utility fixture of FIGS. 3 and 4 can be utilized; and FIGS. 14–19 are schematic illustrations of various ways in which the utility fixture of FIGS. 5 and 6 can be utilized.

Throughout the various views of the figures, like reference characters are applied to like elements.

Figure 1:
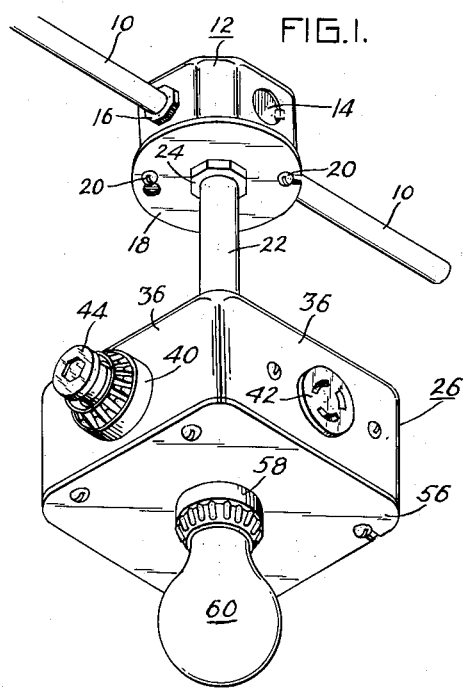
FIG. 1 is a perspective view of a utility fixture in accordance with the invention, as connected into a metallic covered distribution system.

For purposes of illustrating the utility fixture of the present invention, and one of the important practical uses thereof, the fixture is shown in FIG. 1 as connected into a metallic covered distribution system as utilized in buildings including standard ½ inch conduit, for example, indicated at 10. In the construction of new buildings, the metallic conduits forming a metallic conduit system are placed in the slab before each floor is poured. A standard electrical conduit box 12 is secured between adjacent ends of the conduit, and which box 12 can be recessed in the slab if desired. Knock-out openings 14 are usually provided in the four sides of the box to permit proper association with the conduits, and the conduits and boxes are locked together by usual means such as indicated at 16. A standard cover plate 18 is adapted to cover the open face of box 12, and is secured thereto by bolts or screws 20. In accordance with the teachings of the invention, an opening is provided in this cover plate into which a short section of conduit 22 is locked by means of nut 24.

The chassis of the present utility fixture designated broadly 26 is connectable to the free end of the conduit section 22 by means of a nut and the like 28, which also includes a fitting 30 through which the three wires from a three wire system enter into this chassis or box. If desired, a plurality of spaced holes can be provided in the back 32 which will permit the chassis to be secured to a standard conduit box, wall or the like. By reference to FIGS. 4 and 6 it will be seen that this chassis box is provided with a plurality of knock-outs, including a back knock-out 34 to permit fastening on the short conduit section. The four depending sides 36 of the box in the embodiment of FIGS. 3 and 4 are each provided with a single knock-out 38 adapted for mounting for example, a porcelain sign receptacle or a single plug receptacle 42. In the embodiment of FIG. 3, two of these knock-outs have been utilized to permit insertion of single plug receptacles and a third one for a sign receptacle. The plug receptacle 42 is of a three wire grounded type for purposes which will be explained hereinafter. The sign receptacles 40 are adapted for insertion of fuses, pilot lights or light bulbs. In this embodiment the knock-outs 38 on each side 36 are of the same size and shape as is used for sign receptacles.

In the embodiment of FIGS. 5 and 6, however, two of the sides 46 are provided with twin punchings 48 so shaped and spaced as to accommodate double plug receptacles 50 which likewise are of a three wire grounded system type. In FIG. 5, two of these double plug receptacles are shown as installed in the twin knock-outs 48, while a porcelain sign receptacle 40 is utilized and mounted in one of the single side knock-outs 52 formed in the remaining two sides 54 of the box chassis. Of course, it is not necessary to utilize each of the knock-outs to contain either plug receptacles or porcelain sign receptacles, since the use of the box or chassis, and the elements connected therein or thereon will depend upon the ultimate use to which the fixture is to be put. This will be evident from FIGS. 3 and 5 wherein knock-outs 38, 48 and 52 remain in the box.

Figure 2:
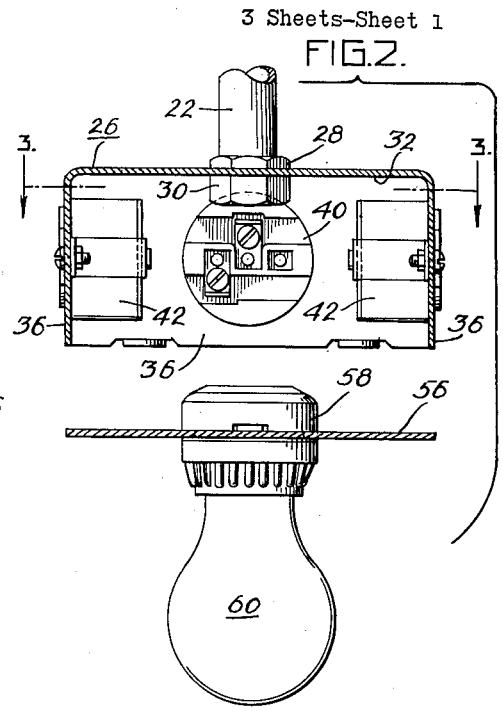
FIG. 2 is a sectional view of the chassis of the utility fixture showing different types of electrical fittings therein and with the cover removed.

As shown in FIGS. 1 and 2, a cover plate can be utilized to close the chassis. This cover 56 can, if desired, be provided with a light bulb socket 58 of a usual known type extending through an opening provided for that purpose, and a light bulb 60 secured therein.

The versatility and adaptability of this chassis and utility fixture will be apparent from a study of the schematic wiring diagrams and electrical connections shown for the two types of boxes in FIGS. 7 to 13 inclusive, and FIGS. 14 to 19 inclusive, respectively.

FIG. 7 shows a utility fixture equipped with two sign receptacles on separate circuits as would be used for lighting or signal lights.

FIG. 8 shows a utility fixture equipped with one single plug receptacle, broken lines indicating where additional receptacles may be placed.

FIG. 9 shows a utility fixture equipped with two single plug receptacles, each on a separate circuit, and with separate fuse protection for each receptacle.

FIG. 10 shows a utility fixture equipped with two single plug receptacles, each on a separate circuit, with a pilot light for each.

FIG. 11 shows a utility fixture equipped with one single plug receptacle, and fuse protection as provided by use of a porcelain sign receptacle and a screw base fuse.

FIG. 12 shows a utility fixture equipped with two single plug receptacles and a single circuit feed. Pilot light and fuse protection are installed in the circuit.

FIG. 13 shows a utility fixture equipped with porcelain sign receptacles and wired for use as a lighting fixture.

As pointed out above, additional receptacles may be installed on the plate cover for the utility fixture, although this is not shown in the schematic wiring diagrams.

The foregoing types of circuits and uses refer to that type of chassis shown in FIGS. 3 and 4 of the drawings. FIGS. 14 to 19 of the drawings disclose circuits and electrical connections as applied to the chassis of a type shown in FIGS. 5 and 6.

FIG. 14 shows a utility fixture equipped with one duplex receptacle. Broken lines indicate where an additional duplex and two single plug receptacles could be installed.

FIG. 15 shows a utility fixture equipped with one fuse protected duplex plug receptacle and one lighting receptacle, each on a separate circuit.

FIG. 16 shows a utility fixture equipped with two duplex plug receptacles, each on a separate circuit and with a pilot light for each.

FIG. 17 shows a utility fixture equipped with one fuse protected duplex plug receptacle and one lighting receptacle, each on a separate circuit.

FIG. 18 shows a utility fixture equipped with two duplex plug receptacles protected by a single fuse, and a pilot light to indicate whether or not the feeder circuit is energized.

FIG. 19 shows a utility fixture equipped with sign receptacles and used as a lighting fixture. Duplex plug receptacles could be installed in the opposite blank sides, and wired to lighting circuit or to a separate circuit, if desired.

There are many ways wherein the use of the utility fixture of the present invention in one of the forms described above or in any desired combination will reduce maintenance and operation costs in industry. As some examples of these, the following are of interest.

*Laundries.*—Women operators are employed in laundries to do hand ironing. The usual procedure is to have from 2 to 4 hand irons plugged in on one electrical circuit. When trouble develops in an iron, the fuse blows at the main panel and the maintenance man must be called to correct the trouble. He must then determine which iron caused the trouble, replace it with another and then replace the fuse. During this period, four employees must stand by while the trouble is being located and repaired.

With a fuse for each iron as could be provided with the present utility fixture, when an operator notices that her iron is getting cold she could check the fuse. If it were blown, she would pull the plug on her iron and replace the fuse. If the new fuse blew upon replugging this iron, it would then be known that the trouble was in this particular iron. Another iron would then be obtained and the old one would be sent to the maintenance man for repair. The other three operators could continue working without interruption.

*Manufacturing.*—In the manufacturing of radios and television sets, as well as other types of electrical appliances, operators are employed to solder wires to terminals and small parts. Their soldering irons frequently develop trouble, which in turn slows down operations in the same manner a faulty hand iron in a laundry and can become expensive to the operator of the laundry.

*Garages and body works.*—The utility fixture is so designed that it can be suspended from the ceiling of the room. A piece of conduit could be used in this connection and the fixture would be located between the cars at a height of about seven feet from the floor. This would make it possible for the mechanic to plug his electric drill or sander into a fused receptacle that would be located within ten feet of his work and would eliminate a long cord lying on the floor and lying over a bench to a receptacle located in the conventional manner in a wall.

*Service stations.*—Fixtures could be suspended from a ceiling as in the garages and used for a trouble light extension cord when cars are being greased.

*Print shops.*—Off-set printing presses, paper punches, electric staple machines and other equipment could be moved from one portion of the floor to another without the necessity of running a lot of extension cords over the floor when utility units are suspended from the ceiling. When trouble develops in one piece of equipment, only the fuse supplying that particular piece of equipment would blow, and the other equipment would continue to operate.

*Building and construction.*—One of the more important uses of the present utility fixture would be in this field. When new buildings are under construction, the usual procedure is to string a pair of wires on each floor to the various areas of that floor. From this pair of wires, lights and plug receptacles are attached to meet the needs of the construction workers. When two "skill-saws" or the like start at the same time, almost invariably a fuse is blown. The fuses in the old system are located in the basement of the building and it requires the services of a maintenance electrician to locate the fuse and replace it. In addition to the extra expenses from loss of time, there is a complete lack of safety with respect to the temporary electrical installation. Old second hand wire is primarily used for the temporary circuits, and there is no provision made for a "return ground" to make it possible for a person to use a three prong plug and ground the shell of the electrical tool as required by safety laws.

The present utility fixture is well adapted and designed to be used with a metallic conduit system. The conduit is placed in the "slab" before each floor is poured. Later this conduit is used for the hall lights. During the construction of the building this same conduit can be used for the temporary light and power circuits.

The lighting circuit would be fused for 15 amps. If a person attempted to use a socket type receptacle adaptor in the lighting circuit and plug in an electrical tool, the lights would go out when the tool was turned on because it would "pull" more than 15 amps. and blow the fuse. Lighting fuses would be located as now, in the basement, and the maintenance electrican would then check to find where the unauthorized tool was being used.

The receptacle plug circuit would be fused for 60 amps. and this would be broken down at the fixture by use of 30 amp. fuses. Three prong, grounded receptacles would be used in the utility fixtures on construction jobs, thereby making it necessary for all tools to have three conductor cords. In addition to making the job a safe one, such a system should result in a substantial reduction in the insurance rates covering the construction operation.

When the job is completed, the electrical contractor will remove the utility fixtures for use on the next job. The same wire and conduit will be used for the hall light fixtures.

The uses of the present utility fixtures should eliminate a substantial amount of questionable time now incurred by having maintenance electricians on the job at all times when anyone else is working on the project. Anyone can change a fuse when the building is under construction, just as the same person would change a blown fuse when the construction was completed and the building was in regular use. The only fuses that would not be available to all persons employed on the job would be the main fuses at the service panel. These would be serviced by the maintenance electrican who would also make any changes in circuits, extensions to circuits, repair cords and electrical tools and the like.

The use of utility fixtures of the present invention in connection with a grounded conduit system will provide maximum possible safety. When equipped with a known type of three prong plug receptacles which require a twisting action to lock a plug therein, and three conductor cords to the tool or appliance, it is possible to ground the outside shell or frame of the tool or appliance which conforms to the best safety practices. The use of such three prong receptacles would also render it impossible to plug in tools or appliances equipped with two conductor cords. The light circuit which would be fused at the main panel for 15 amps. would also prevent the use of tools having a two conductor cord and plug since, if a person was to unscrew a light bulb and insert a plug receptacle in the light receptacle in order to use such a tool, the 15 amp. fuse would blow and all lights on the circuit would go off. This would give ample warning that unauthorized tools or appliances were being connected to the electrical system.

Where a utility fixture is used as an extension cord junction box, or cord terminal for the first length of extension cord on the conduit system, a three conductor cord would be used with a twist type plug referred to above to be inserted at the conduit mounted utility box. The third wire in this cord would be grounded to the chassis of the utility fixtures at each end of the cord.

It will accordingly be understood that the utility fixture of the present invention is a very versatile one, providing for substantial cost decreases in manufacturing, building, and other industries, while at the same time providing for a high degree of safety in many types of operations. While specific embodiments have been set forth hereinabove for purposes of illustration only, it will be readily apparent to those skilled in the art that minor changes can be effected without departing from the spirit and scope of the invention as defined in and limited solely by the appended claims.

I claim:

1. In combination with a grounded metallic protected electrical distribution system, an open side standard electrical conduit box, electrical distribution means in said system connected into said conduit box, a utility fixture comprising a metal box chassis having a plurality of apertures closed by knock-out punchings in the sides thereof, said chassis having an opening in the back thereof, attachment means for connecting said chassis to said conduit box including a length of metal electrical conduit having one end thereof secured in said back opening and the other end of said conduit being connected to a conduit box cover plate having an opening therethrough and removably connected to the open end of said conduit box, a three prong twist type plug receptacle mounted in an aperture formed by removal of one said punching, a sign receptacle mounted in another aperture formed by removal of another of said punchings and means interconnecting said plug receptacle and sign receptacle with said electrical distribution means connected into said conduit box.

2. The invention as claimed in claim 1 wherein said three prong receptacle is a duplex unit and said punchings in one side being double and removed to provide apertures to accommodate said duplex receptacle.

3. The invention as claimed in claim 2, and wherein duplex plug receptacles are mounted in opposing sides of said chassis.

4. The invention as claimed in claim 3, and wherein a fuse is mounted in said sign receptacle electrically connected with a said plug receptacle.

References Cited in the file of this patent

UNITED STATES PATENTS

| | | |
|---|---|---|
| 844,276 | Fralick | Feb. 12, 1907 |
| 1,044,063 | Leik | Nov. 12, 1912 |
| 1,233,188 | Coggeshall et al. | July 10, 1917 |
| 1,265,294 | Bissell et al. | May 7, 1918 |
| 1,701,935 | Ryan | Feb. 12, 1929 |
| 1,847,924 | Calderwood | Mar. 1, 1932 |
| 2,435,794 | Nicolazzo | Feb. 10, 1948 |
| 2,518,812 | Oswald | Aug. 15, 1950 |
| 2,588,760 | Pryne | Mar. 11, 1952 |
| 2,637,793 | Korecki | May 5, 1953 |
| 2,701,349 | Fisher | Feb. 1, 1955 |
| 2,732,090 | Karlin | Jan. 24, 1956 |